United States Patent
Thornton et al.

(10) Patent No.: US 10,733,780 B2
(45) Date of Patent: Aug. 4, 2020

(54) PORTABLE AND PERSISTENT VIRTUAL IDENTITY SYSTEMS AND METHODS

(71) Applicant: DG Holdings, Inc., Salt Lake City, UT (US)

(72) Inventors: James Thornton, Salt Lake City, UT (US); Matthew Wilburn, Salt Lake City, UT (US); Berkley Frei, Salt Lake City, UT (US); Jon Middleton, Salt Lake City, UT (US); Steve Spencer, Riverton, UT (US); Brian Howell, Spanish Fork, UT (US); Chris Madsen, Orem, UT (US); Jesse Gomez, Salt Lake City, UT (US); Jesse Janzer, Salt Lake City, UT (US)

(73) Assignee: DG Holdings, Inc., Salt Lake City, UT (US)

( * ) Notice: Subject to any disclaimer, the term of this patent is extended or adjusted under 35 U.S.C. 154(b) by 0 days.

(21) Appl. No.: 15/797,913

(22) Filed: Oct. 30, 2017

(65) Prior Publication Data
US 2018/0122124 A1 May 3, 2018

Related U.S. Application Data

(60) Provisional application No. 62/415,023, filed on Oct. 31, 2016.

(51) Int. Cl.
*G06T 13/40* (2011.01)
*G06T 17/10* (2006.01)
(Continued)

(52) U.S. Cl.
CPC .......... *G06T 13/40* (2013.01); *G06K 9/00268* (2013.01); *G06T 15/005* (2013.01);
(Continued)

(58) Field of Classification Search
CPC ....... G06T 13/40; G06T 15/005; G06T 17/00; G06T 17/10; G06T 17/20; G06K 9/00268; G06Q 10/10
See application file for complete search history.

(56) References Cited

U.S. PATENT DOCUMENTS 8,522,330 B2    8/2013 Shuster et al.
2010/0185640 A1 *  7/2010 Dettinger .............. G06Q 10/10
                                                        707/758
(Continued)

OTHER PUBLICATIONS

International Search Report and Written Opinion dated Jan. 9, 2018 for PCT/US2017/059083.

*Primary Examiner* — Yu Chen
(74) *Attorney, Agent, or Firm* — Stoel Rives LLP; R. Whitney Johnson; Andrew C. Wasden

(57) ABSTRACT

Systems and methods for generating and porting a persistent virtual identity. Generating and porting a persistent virtual identity can include processing a 3D asset received from a source application, determining a plurality of standards associated with the 3D asset, comparing the plurality of standards associated with the 3D asset with a plurality of standards enforced by a destination application, configuring the plurality of standards associated with the 3D asset to correspond with the plurality of standards enforced by the destination application based on a determination that the plurality of standards associated with the 3D asset do not conform to the plurality of standards enforced by the destination application, and transferring the 3D asset to the destination application based on a determination that the plurality of standards associated with the 3D asset conform to the plurality of standards enforced by the destination application.

8 Claims, 7 Drawing Sheets

(51) Int. Cl.
*G06K 9/00* (2006.01)
*G06T 15/00* (2011.01)
*G06T 17/20* (2006.01)
*G06T 17/00* (2006.01)

(52) U.S. Cl.
CPC .............. *G06T 17/00* (2013.01); *G06T 17/10* (2013.01); *G06T 17/20* (2013.01)

(56) References Cited

U.S. PATENT DOCUMENTS

| | | | |
|---|---|---|---|
| 2012/0069131 A1* | 3/2012 | Abelow | G06Q 10/067 348/14.01 |
| 2012/0190458 A1 | 7/2012 | Gerson et al. | |
| 2013/0047217 A1* | 2/2013 | Shuster | G06T 19/20 726/4 |
| 2013/0212228 A1* | 8/2013 | Butler | H04L 65/605 709/219 |
| 2013/0275886 A1 | 10/2013 | Haswell et al. | |
| 2017/0213473 A1* | 7/2017 | Ribeira | G06F 19/3456 |

\* cited by examiner

PORTABLE AND PERSISTENT VIRTUAL IDENTITY SYSTEMS AND METHODS

RELATED APPLICATION

This application claims the benefit under 35 U.S.C. § 119(e) of U.S. Provisional Application No. 62/415,023 filed Oct. 31, 2016, which is hereby incorporated by reference herein in its entirety.

TECHNICAL FIELD

The present disclosure relates to electronic or other virtual representations of an individual or entity in a computer generated environment. In particular, the present disclosure relates to systems and methods for portable and persistent virtual identity across applications and platforms.

DETAILED DESCRIPTION OF PREFERRED EMBODIMENTS

Figure 1:
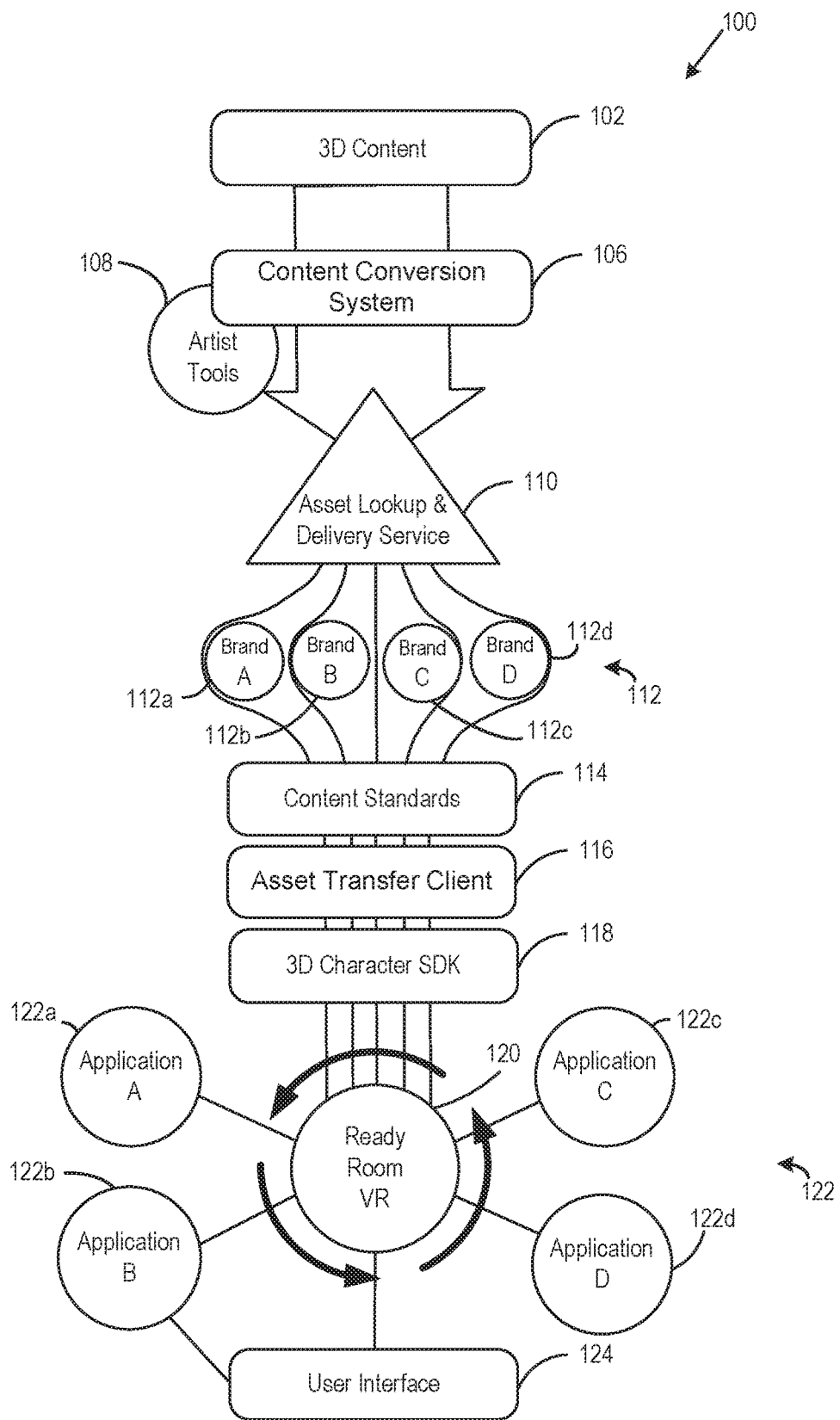
FIG. 1 is a system diagram for a persistent virtual identity system, according to one embodiment.

Individuals are increasingly interacting with computing devices, systems, and environments and with other individuals in electronic or virtual forums, such as in computer games, social media and other Internet forums, virtual/augmented reality environments, and the like, sometimes referred to as cyberspace. These electronic interactions, whether individual-machine interactions or individual-individual interactions, increasingly are facilitated by a concept of virtual identity for each party to the interaction, which may be referred to as an application identity. The virtual identity enables a given party to identify itself to other entities in an interaction and/or enables other parties to recognize or identify the given party during the interaction.

A virtual identity can be embodied as simple as a profile, and can be more complex such as including an avatar or other graphical representation, a persona (e.g., an aspect of character of the virtual identity that is presented to or perceived by others), and/or a reputation (e.g., beliefs or opinions that are generally held about the virtual identity). In virtual reality (VR) applications, virtual identity can be very complex in order to provide a fuller, richer identity to other entities in VR encounters or other interactions. A virtual identity can be used to associate application data with a user. For example, a virtual identity can be used to correlate user data, application settings, pictures, and/or profiles with users, among other types of application data.

Presently, virtual identities are limited to a single application (e.g., specific to a given application and nontransferable to other applications). That is, a user may create a virtual identity for a given application and that virtual identity is not portable to, or persistent in, a different application. A user must create a separate virtual identity to use with each of a plurality of applications. As such, the user may have the burden of managing and/or maintaining a plurality of virtual identities. If the user experiences a change (e.g., a change of name, address, phone number, or the like), or desires to effectuate a change to a virtual identity (e.g. a change of an aesthetic feature such as an icon), then the user may have the burden of propagating the change through a plurality of virtual identities, each corresponding to a different application.

As virtual identities grow more complex and detailed (e.g., including greater amounts of associated information) the burden on a user may be further enhanced. For example, if the application identity is associated with a virtual application having a visual aspect, then the virtual identity may include a virtual avatar and other types of data associated with the virtual identity. A user may create, manage, and/or maintain a different virtual avatar for each of a plurality of virtual applications. If a user makes a change to an avatar associated with one virtual identity (e.g., a change of hair color), the user would need to then make the same change to the avatar associated with each other virtual identity in which the user may interact. In other words, if a user wants consistent (e.g., identical or similar) virtual identities across multiple applications, then when the user changes the hair color (or most any other visual aspect, such as shape, height, muscle definition, tattoos, sex, art style, default animation sets) of an avatar (e.g., a bipedal humanoid character) for a given virtual identity in one application the user will also have to make that same change for all other applications in which the user desires the corresponding avatars and/or virtual identities to be consistent.

A persistent virtual identity (e.g., including such aspects as an avatar, persona, reputation, etc.) that is portable across applications and/or platforms may be desirable. In some embodiments of the present disclosure, a single persistent virtual identity can be created, managed, and maintained for (and may be portable to) a plurality of applications, platforms, and/or virtual environments, whether social, business, gaming, entertainment, or any other platform that facilitates or otherwise wants users to have a visual presence in it.

An application can be a standalone computer program. An application can be a computer program to perform a group of coordinated functions, tasks, or activities for the benefit of a user. A video game may be an example of an application. An application that is a standalone computer program may optionally include or interact with online or remotely located components, such as data stores and cloud computing resources. A platform can be a group of different applications, services, and/or computing resources that provide a broader service. A platform can be or otherwise provide the environment in which an application is executed, and may include the hardware or the operating system (OS), or other underlying software (e.g., the stage on which applications and other computer programs can run). A platform may be heavily tied to or directed to an online functionality, such that the different applications, services, and/or computing resources may be distributed, or remotely located and interconnected via a network. A platform can provide a computing environment for a virtual environment (e.g., a virtual world). A persistent virtual identity can be developed and/or employed in multiple applications, platforms, and/or virtual environments.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods or components. Further, in some cases, well-known structures, or operations are not shown or described in detail in order to avoid obscuring aspects of the embodiments. Furthermore, the described features, structures, or characteristics may be combined in any suitable manner in one or more embodiments.

FIG. 1 is a system 100 diagram for a persistent virtual identity system according to one embodiment. The system 100 can include 3D content 102, a content conversion system 106, artist tools 108, an asset lookup and delivery service 110 (and/or library), content standards 114, an asset transfer client 116, a 3D character SDK 118, and a ready room in virtual reality (VR) 120. The system 100 can also include brand modules 112a, 112b, 112c, and 112d (sometimes referred to generally and collectively as "brand module(s) 112"). The system 100 can include a plurality of applications 122a, 122b, 122c, 122d (sometimes referred to generally and collectively as "application(s) 122") As can be appreciated, in some embodiments the applications 122 may be on a single common computing platform (e.g., in a common VR environment). In other embodiments, one or more on the applications may be on different, unique computing platforms. A user may interact with the system 100 by way of a user interface 124 that interfaces via the applications 122 and/or the ready room VR 120. The user interface 124 may be or operate on a user computing device. A user of the system 100 may include electronic users, such as a bot or an AI application, in addition to human users.

The system 100 can provide the ability to create and/or maintain a persistent virtual identity and/or a corresponding 3D asset(s), and to enable transport of such between applications (e.g., different games) and/or platforms (e.g., different augmented reality (AR) or VR systems). As used herein, the persistent virtual identity can include a base 3D asset (e.g., an avatar model and modifications thereto), following 3D assets (e.g., clothing, accessories, etc.), history associated with a user of the system, social reputations, social standing, inventory, wardrobe (e.g., additional clothing following 3D assets, which may include pre-saved outfits), and/or trophies, among other items associated with the persistent virtual identity. A virtual identity may include multiple 3D assets, which can include one or more base 3D assets (e.g., multiple avatars) and one or more following 3D assets. The 3D asset(s) can be at least partially defined using geometric data. The 3D asset(s) can further be presented as an avatar associated with the persistent virtual identity. For sake of simplicity, a "3D asset" referenced hereafter may be a base 3D asset, a following 3D asset, or a combination of one or more of these.

The applications 122 can be VR applications. The applications 122 can be independent of each other. The applications 122 can be gaming applications, social media applications, instructional applications, business applications, and/or any other type of application employing VR techniques. The brand modules 112 can provide conformity standards for the applications 122. That is, a 3D asset generated in the system 100 can conform to the standards defined by the brand modules 112 to be compatible with the respective applications 122. The applications 122 may all be on a single platform (e.g., HTC Vive®, Oculus Rift®, PlayStation VR®), or may be on different platforms.

In some examples, the applications 122 and/or the brand modules 112 can be external to the system 100. That is, the applications 122 and/or the brand modules 112 can be implemented independent of the system 100 (e.g., separate and distinct from the ready room VR 120, the asset lookup and delivery service 110, and the content standards, 114, although interfacing or otherwise communicating such as through an API). The applications 122 and the brand modules 112 are correlated. Stated differently, the brand modules 112 correspond to and provide standards, rules, protocols, and/or the like for the applications 122. For example, the application 122a is associated with the brand module 112a, the application 122b is associated with the brand module 112b, the application 122c is associated with the brand module 112c, and the application 122d is associated with the brand module 112d.

The system 100 can enable a persistent virtual identity that is portable and persistent to exist and be transported between the applications 122. A developer and/or a user can integrate or otherwise interconnect with the system 100 (e.g., via applications 122 and/or user interface 124, and generally over a network) to both create a persistent virtual identity, and potentially to interact with other persistent virtual identities created by and corresponding to other users. The user and/or the application developer can exercise control over the created persistent virtual identity. For example, the user can, through the user interface 124, interconnect with the ready room VR 120 to manipulate the virtual identity. The user can also manipulate the virtual identity through applications 122. FIG. 1 shows the user interface 124 interconnected with the system 100 through the ready room VR 120 and the application 122b.

The system 100 can include a three dimensional (3D) character software developer kit (SDK) 118 (e.g., an MCS Plugin). The 3D character SDK 118 may be a library that can be implemented in an application 122. The 3D character SDK 118 includes functionality to perform operations like create 3D assets (e.g., avatars, in a scene), shape them, add/remove clothing and other following 3D meshes, etc. The 3D character SDK 118 also includes functionality to obtain 3D models (for base 3D assets) and accompanying information from the local cache (and if a 3D model and/or accompanying information isn't in the local cache, the 3D character SDK 118 can transparently fetch the 3D model and/or accompanying information from the cloud). The 3D character SDK 118 can also transform 3D models into game ready objects, namely 3D assets. The 3D character SDK 118 can also provide other asynchronous operations, which provides an event or task queue.

The system 100 can also include an asset transfer client 116 (e.g., ready room plugin) and an asset lookup and delivery service 110 (and/or library). The asset transfer client 116 and the asset lookup and delivery service 110 can be local and/or remote to the system 100. That is, the asset transfer client 116 and/or the asset lookup and delivery service 110 can be executed (e.g., hosted) on a network computing device remote to the system 100 that can be accessed by the applications 122. As used herein, the asset lookup and delivery service 110 allows the asset transfer client 116 to request a specific 3D asset with permutations on the request for specific level of detail, material, and texture variation. The asset lookup and delivery service 110 can also provide (e.g., stream) the 3D asset to the asset transfer client 116. As used herein, a material may be a combination of texture files, shaders, and different maps that shaders use (normal map, occlusion map) and other data such as specularity and metallic levels depending on the material type. A material may be a visual layer that makes something within a 3D asset look like more than just polygons.

The asset transfer client 116 can include two or more components remotely located from each other and communicating together, such as over a network. A first component of the asset transfer client 116 can be implemented in the user interface 124 and/or the applications 122. A second component of the asset transfer client 116 can be implemented in the system 100. The first component of the asset transfer client 116 can communicate with the second component of the asset transfer client 116, for example to request a 3D asset. The component of the asset transfer client 116 implemented in the system 100 can request or otherwise obtain the 3D asset from the asset client lookup and delivery service 110.

The system 100 can also include the content standards 114 which includes standards for the brand modules 112 and/or the applications 122. The content standards 114 can specify types of content or groups of content based upon the creator of the asset, the genre of the asset, or the art style of the asset. The content standards 114 can specify types of content or groups of content through the use of filters. The filters can operate on metadata associated with the 3D assets comprising the content or groups of content. The metadata can identify a vendor from which the 3D asset originated, a genre of the 3D asset, and an artistic style of the 3D asset, among other types of data included in the metadata.

A genre can include, for example a fantasy genre, a science fiction (sci-fi) genre, a comic book genre, and/or contemporary genre, among other genres. An artistic style can be defined by vendors who create new artistic styles. The system 100 can have a default artistic style such as a Nikae artistic style and a Minecraft-esque artistic style.

The content standards 114 can also specify what types of 3D assets are allowed in respective applications 122 and/or what types of 3D assets are not allowed in respective applications 122. For example, the content standards 114 can define that 3D assets with a default artistic style and a fantasy genre are allowed in a given corresponding application 122c and that 3D assets of a different artistic style and a different genre are not allowed in the application 122c.

The content standards 114 can also specify that 3D assets originating from a particular vendor are allowed in a corresponding application from the applications 122. For example, the content standards 114 can restrict the transfer of 3D assets to the application 122d to 3D assets that were originated by a vendor of the application 122d.

The content standards 114 can define 3D assets that are restricted from specific brand modules 112 and/or applications 122 to maintain consistent or inconsistent visual effect. The content standards 114 can be implemented in the asset lookup and delivery service 110 to regulate content provided to the applications 122. The content standards 114 can also be implemented in applications 122 and/or the user interface 124 as part of the asset transfer client 116 to regulate content downloaded and cached at the applications 122 and/or the user interface 124.

The artist tools 108, the content conversion system 106, and the ready room VR 120 may be supporting systems to the system 100. Stated otherwise, they may be supplemental and/or ancillary to the system 100, such that they could be implemented separately and distinctly (e.g., on a different computing device, network, or the like) from other elements of the system 100. The artist tools 108 can modify 3D assets to make the 3D assets compatible with the 3D character SDK 118. The content conversion system 106 can convert the 3D content 102 to be performant (e.g., to perform well, such as within performance metrics) for run time applications. The content conversion system 106 can also convert the 3D content 102 to be compatible with the 3D character SDK 118. The 3D content 102 can include, for example, high fidelity photo-real assets and/or low fidelity game-ready assets. The 3D content 102 can be created, for example, by a 3D content creator such as a Daz® 3D application.

The ready room VR 120 can be an application. The ready room VR 120 can be a hub and/or a starting point for persistent virtual identity creation. The ready room VR 120 can also be a default process for moving persistent virtual identities between applications.

The 3D character SDK 118 can enable a base figure (e.g., a base 3D asset representing an avatar that is part of a persistent virtual identity, or other base 3D asset) to be changed into any shape and/or size and retain full functionality for fitting clothing, animating, and/or customizing. Using the 3D character SDK 118, the base 3D asset can be extendable to a potentially unlimited number of variations for creation of a unique avatar. Stated otherwise, characteristics of a 3D asset can be modified in a potentially unlimited number of combinations of variations. Then the system 100 can enable the resultant unique avatar to retain a visual identity across artistic stylings (e.g., if the application 122a implements a first styling, for example a cartoon styling, and the application 122b implements a second styling, for example a realistic styling, then the unique avatar can retain a visual identity as the avatar is shown in a cartoon styling in the application 122a and a realistic styling in the application 122b). The 3D character SDK 118 can include a number of modules and/or services for performing specific operations to modify or otherwise configure characteristics of 3D assets. For example, the 3D character SDK 118 can include a morphing module, a joint center transform (JCT) bone module, a standard shape module, a projection module, a head scanning to a dynamic mesh fitting module, a heterogeneous mesh behavior module, a hair module, and a smart props module.

The artist tools 108 is one or more standalone modules, potentially including computer-readable instructions configured to convert 3D assets to a form/format compatible with the system 100. The artist tools 108 can receive a 3D asset (e.g., geometry), which may be configured in a number of different formats. The artist tools 108 can be configured to group the geometry into items; set up the level of details (LODs) for an item; generate geographical maps (geomaps); add self-defining behavioral information to objects for run-time simulation; set up materials and generate materials for different platforms; configure the geometries' multilayered characteristics for runtime-optimized multilayer depth and volumetric preservation between meshes; and/or set up zones on items for heterogeneous mesh deformation (e.g., so that something like metal deforms differently than cloth to an avatar's shape). As used herein a geomap comprises geometry, a vertex index, and a map outlining an optimized correlation between a following mesh and base mesh to be used for real time calculation and generation of multilayer depth solutions and/or projection solutions. Projection references the act of projecting a deformer from one mesh to another.

The artist tools 108 also set up the custom shaping of a base 3D asset and set up the 3D assets into specific art styles to allow automatic avatar preservation between art styles. The output of the artist tools 108 can be either a single 3D asset and/or a collection of 3D assets which can be compatible with the 3D character SDK 118. The 3D assets modified by the artist tools 108 can be uploaded to the asset lookup and delivery service 110. The 3D assets can further be configured at the asset lookup and delivery service 110 for user specified distribution based upon rules and conditions associated with the 3D asset and as provided by the brand modules 112.

The ready room VR 120 can be a base application that facilitates interaction between a user and the system 100. A base application can be different from the applications 122, such that the base application is a standalone application that can be executed independently from the applications 122. The user can create and customize a 3D asset via the ready room VR 120 using additional content (e.g., following 3D assets) converted with the artist tools 108, made available through the asset lookup and delivery service 110, delivered through the asset transfer client library 116, and passed to the 3D character SDK 118. For example, the user can, via the user interface 124, access the ready room VR 120 to create and/or customize a 3D asset and launch at least one of the applications 122 through the ready room VR 120.

In some examples, the user can create and customize an avatar (or otherwise configure a base 3D asset) via the application 122b. For example the user can access the application 122b and through the application 122b access the ready room VR 120, or functionality of the ready room VR 120 (e.g., to create and customize a 3D asset). Stated differently, functionality of the ready room VR 120 may be implemented or otherwise integrated with the application 122b, such that a user of the application 122b can create and/or customize an avatar or other 3D assets within the a context of the application 122b.

The ready room VR 120 can showcase the core functionality of the system 100 from an end user's perspective. The ready room VR 120 can provide both a place to customize a 3D asset, including an avatar, a shape and/or clothing associated with the 3D asset, and a place to demonstrate the process and/or standards of "walking between applications." The ready room VR 120 provides multiple means to transfer an identity between applications 122, interconnect between multiple open VR applications 122, and incorporate face scan data onto the avatar. The ready room VR 120 can provide different example implementations of a user interface (UI) for shopping, previewing, and/or checking out of stores, among different types of checkout processes.

Once compatible content is acquired, a user can use and customize the 3D asset. A persistent virtual identity for the user can be created, and then the user can activate a mechanism to allow an acquired and/or created 3D asset (e.g., avatar) to transport (e.g., transfer) or step into any one of the applications 122. That is, a 3D asset associated with a user can retain an identity as the 3D asset transitions from the ready room VR 120 into one of the applications 122, and then provide end points for the user to return to the ready room VR 120. The virtual identity of a user, including a corresponding avatar or other 3D asset, can be maintained consistent across multiple applications 122, and as the virtual identity is transported from one application 122, to the ready room VR 120, and/or to another application 122. The 3D asset can also extract and retain items (e.g., a virtual weapon, or other object 3D asset) from the applications 122 that can persist in the ready room VR 120 as the 3D asset transitions from one of the applications 122 into the ready room VR 120 and then to another of the applications 122.

The persistent virtual identity can be associated with, and representative of a user that is external to the system 100. A user can be a human user and/or an automated user.

In some examples, transitioning a 3D asset from a first application (e.g., application 122a) to a second application (e.g., application 122b) can include conforming to standards set by the second application. The standards can include a specific art style and/or theme. Transitioning a 3D asset from a first application to a second application can include placing the 3D asset in a VR room (e.g., lobby) of the first application 122a where the user and/or the 3D character SDK can initiate the required changes to the 3D asset before fully transitioning the 3D asset to the second application.

The transfer of 3D assets between applications includes configuring a 3D asset so that the 3D asset's customizations are retained as the 3D asset transitions from one application to a different application, such that the settings and status of the 3D asset remain the same. The transfer of 3D assets is one example of a persistent virtual identity. The transfer of 3D assets can be accomplished by utilizing a local backdoor module and/or a remote restore module. These modules enable the transfer of an identity between applications 122.

The local backdoor module can include an application 122a calling the asset transfer client 116 to export a 3D asset (e.g., a 3D asset file) and/or a persistent virtual identity (e.g., an identity file) comprising geometry, skinning, rig, textures, materials, and shaders of the current 3D asset with associated items in use, and/or any additional metadata describing the 3D asset and/or persistent virtual identity. After the export is finished, the application 122a launches the application 122b with reference to the local identity file, and then shuts itself down. The application 122b can access the identity and request the local identity definition from the asset transfer client 116 and load the identity into the application 122b.

The remote restore module can be configured to cause the application 122a to call the asset transfer client 116 to push the identity definition metadata to the asset lookup and delivery service 110. The application 122a can then launch the application 122b with an identity string, and then shut itself down. The application 122b can request that the asset transfer client 116 call the asset lookup and delivery service 110 requesting the identity string. The application 122b can likewise retrieve metadata associated with the persistent virtual identity. The application 122b can use either local 3D assets (e.g., locally stored) or remote 3D assets (e.g., streamed or otherwise provided or accessed from a remote location) to render the avatar.

In some examples, the asset transfer client 116 can comprise one or more components. For example, the asset transfer client 116 can comprise a client and a server. The client can be implemented in the applications 122 and/or computing devices on which the applications 122 are executing. The server of the asset transfer client 116 can be implemented in the system 100. The client can communicate with the server to transfer a 3D asset from the system 100 to the computing device of the applications 122.

To transfer a 3D asset and/or persistent virtual identity between applications, the user can select a destination application 122b from a source application 122a. Once selected, a gate or portal may be generated within the source application 122a. The source application may portray the gate and/or portal as a visual appearance branded for the destination application 122b. The gate and/or portal may transition the 3D asset and/or persistent virtual identity from the source application 122a to virtual space (e.g., referred to as the "airlock") that is configurable and customized by the destination application 122b (e.g., a destination application vendor and/or the corresponding brand module 112b). The mechanism to trigger the transfer of a 3D asset may include walking and/or other locomotion methods within a VR environment provided by the source application 122a toward the gate or portal of the destination application 122b.

The transferring of the 3D asset and/or the persistent virtual identity from source application to the virtual space through the virtual portal may trigger a VR passport check. The VR passport check compares clothing and/or an art style associated with the 3D asset and/or the persistent virtual identity with vendor specific standards of the destination application 122b. If the 3D asset and/or persistent virtual identity does not conform to the destination application 122b, then the user is provided an opportunity to change clothing, art style, or any other aspect associated with the 3D asset and/or persistent virtual identity, to meet the destination application standards. Once the standards are met, a launch mechanism, through another virtual portal, the pushing of a button, or the act of meeting the standards, will initiate a transfer of the 3D asset and/or the persistent virtual identity between the source application 122a and the destination application 122b.

A set of standards between applications 122 and vendors can be defined. The standards can foster an increased level of persistence and transfer to exist between different applications 122. The standards enable enhanced functionality to allow standard behavior and transfer of assets or mechanics between disparate applications 122. For example, an application agnostic content interchange can be defined to facilitate the association between 3D assets and/or persistent virtual identities and a given application 122a (e.g., a source application 122a) and the transfer of the persistent virtual identity to other applications 122 (e.g., a destination application 122b). Transferring the persistent virtual identity and/or 3D asset can include losing permanence in the source application 122a and creating permanence in the destination application 122b with a conforming set of behaviors, mechanics, and appearances.

In some examples, face scan data can be associated with a dynamic mesh. Associating scan data with a dynamic mesh can include taking face scan data and changing a base figure, associated with the 3D asset and/or persistent virtual identity, to incorporate the face scan data such that the base figure retains the same mesh topology while retaining functionality for further shaping of the mesh (e.g., making the face narrower, nose larger, ears pointed, etc.).

The face scan data can be placed on a dynamic mesh. The face scan data can be 3D scanner generated and/or photogrammetry generated (e.g., mesh and texture). The face scan data can also be generated using various images and/or other means. Placing the face scan data on a dynamic mesh can deform the base figure associated with a 3D asset and/or persistent virtual identity to match the visual appearance of the face scan data. Placing the face scan data on a dynamic mesh can generate texture to match the face scan data on the base figure associated with the 3D assets and/or persistent virtual identity.

The face scan data can be compared with the base figure to identify where key facial and head landmarks are on both sets of data (e.g., face scan data and base figure and/or base 3D asset). The base mesh associated with the base figure is deformed to the same shape as the face scan data using automated adjustments of existing blend shapes for each key region of the face. In some examples, a new blend shape can be generated for the base figure to match the face scan data. The face scan generated texture can be analyzed and, using key face and head landmarks, the texture can be rebuilt to fit the base figure's UV map. The face scan generated texture can comprise multiple texture files. The multiple texture files can be combined into a single texture file for the head of a base figure. Fitting face scan data to a base figure can be performed using a custom rig and geomap technology to compare and match the base figure mesh to the face scan data. As used herein, blend shaping, morphing, and deforming references a set of data attached to a mesh which contains positional deltas on geometry and bones to allow the mesh to change shape while not changing its fundamental geometry and/or rig.

When configuring an avatar, if there is face scan data associated with the 3D asset and/or the application identity associated with the 3D asset, the ready room VR 120 can associate the face scan data with the 3D asset such that the 3D asset retains the full customization and compatibility of the base figure without any scanned data. As such, a 3D asset can be configured with the face scan data. The face scan data can be provided, by the user, by uploading a mesh to a server associated with system 100 through at least one of a web form or mobile application.

As used herein, the system 100 can be implemented in a single computing device and/or over a plurality of computing devices. For example, each of the components of the system 100 can be implemented using independent computing devices coupled via a network. In some examples, the system 100 can be implemented using cloud services.

Figure 2:
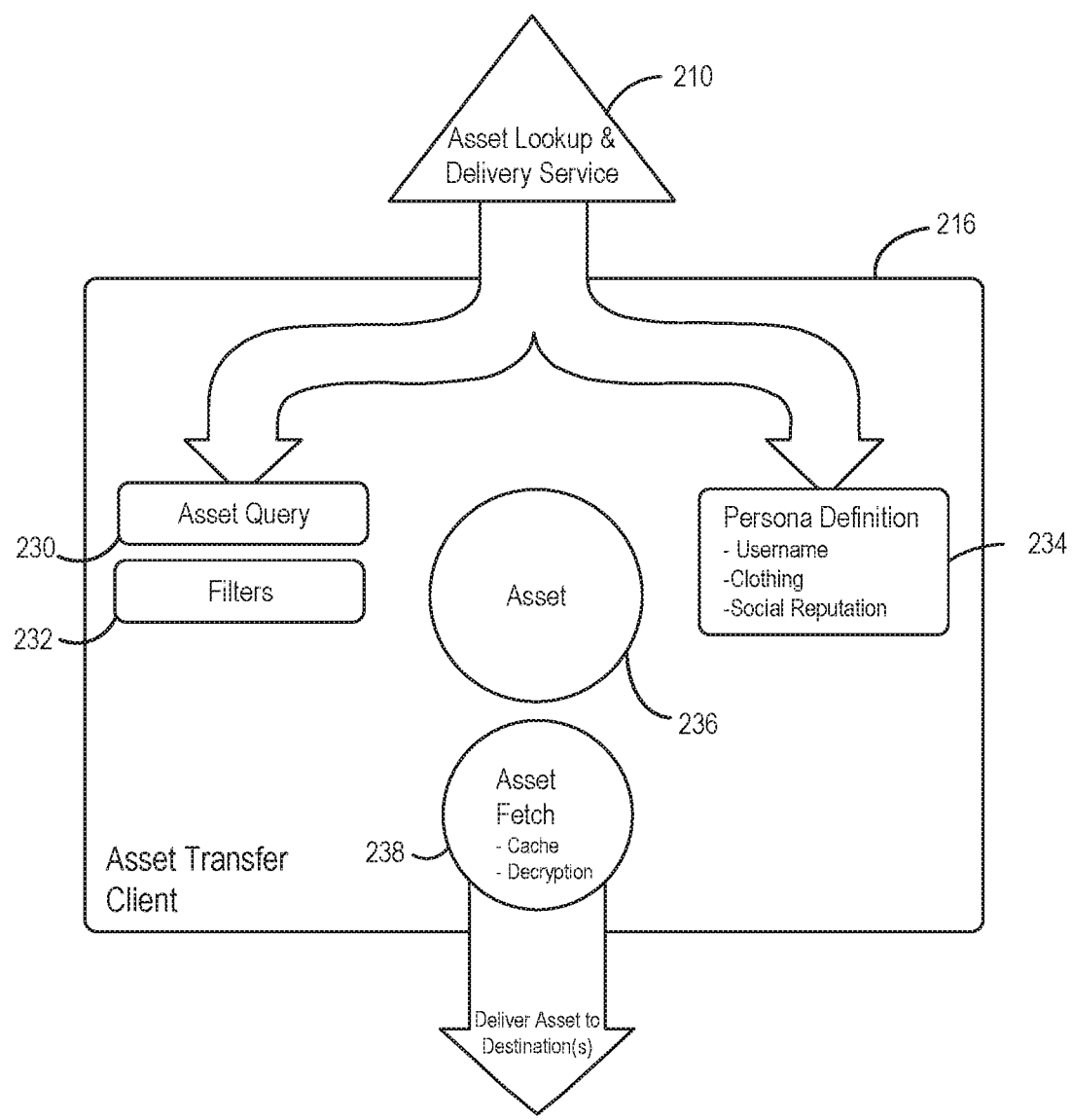
FIG. 2 is a block diagram of an asset transfer client, according to one embodiment.

FIG. 2 is a block diagram of an asset transfer client 216 according to one embodiment. The asset transfer client 216 can receive a 3D asset from the asset lookup and delivery service 210. The asset transfer client 216 can comprise an asset query module 230, filters 232, persona definition module 234, assets 236, and an asset fetch module 238.

The asset transfer client 216 can process the communications (e.g., messages) between remote services and the local handling of assets (e.g., local to the applications 122 in FIG. 1). The asset transfer client 216 can operate independently of the 3D character SDK 118 in FIG. 1 as the asset transfer client 216 is generic, is not tied to any specific 3D engine, and provides an application program interface (API) and/or local service for the 3D character SDK 118 to call against to obtain 3D assets. That is, a client of the asset transfer client 216 can communicate with a server of the asset transfer client 216 to obtain 3D assets that can then be passed to a 3D character SDK 118. The 3D character SDK 118 can also include a client implemented in the computing device of the applications 122 and a server implemented in the system 100 in FIG. 1.

The logical paths in the asset transfer client 216 can perform an asset query via the asset query module 230 and/or an asset filter via the filters 232. The logical paths in the asset transfer client 216 can also access a list of details associated with a 3D asset (e.g., an avatar) via the persona definition module 234. The asset transfer client 216 can also access a specific 3D asset via the asset module 236 and decrypt and/or cache the 3D asset locally. As used herein, decrypting and/or caching a 3D asset locally can include receiving an encrypted 3D asset from the identity system (e.g., system 100 in FIG. 1), decrypting the 3D asset, re-encrypting the 3D asset using a key unique to the user, application, and/or associated computing device, and storing the re-encrypted 3D asset. Examples of the functionality built into those two paths include, but are not limited to, the following: authentication of accounts globally and per vendor channel; encryption and decryption of 3D assets; querying of assets for what is available for vendor channels or for what matches user inputted criteria; reading and updating identity definitions; caching and handling local caching of 3D assets; and shopping and purchasing 3D assets.

The asset transfer client 216 can run as a compiled against library as part of the application and/or as a local service that handles calls. The asset transfer client 216 can process communications, across all applications, with the asset lookup and delivery service 210, local download and storage of 3D assets, and local caching strategies to allow a single download of a 3D asset which is then useable by all applications that request the 3D asset. The asset transfer client 216 can register a new account, create a new identity, update avatar settings, update social rating and reputation data, retrieve a list of content that is associated to an avatar, retrieve a list of potentially wearable content (e.g., following 3D asset) that is available through that application, store requests, download content requests, stream content requests, and any other remote calls that might need to be made.

As previously described, the asset transfer client 216 may include two logical paths of communication for querying for assets. The two paths of communication are a general asset query module 230 and a persona definition module 234. The query module 230 can be used for listing and retrieving metadata and details about 3D assets that are available through the brand modules 112 in FIG. 1, and queries that are specific to the avatar and/or a persistent virtual identity comprising a persona definition as defined by the persona definition module 234. The asset query module 230 provides a list of queries that then get passed to the filter module 232. The filter module 232 allows the 3D assets to be sorted and filtered by various data types. The various data types can include, for example, genre, base figure, clothing type, vendor, etc. The persona definition module 234 can store data about a persistent virtual identity and specifically what virtual objects an avatar, associated with the 3D asset, can use and is currently using. The persona definition module 234 can define, for example, a username, clothing associated with the 3D asset, and/or social reputation associated with the persistent virtual identity.

Both of the paths feed to the asset service or asset module 236, which tracks the requests to eliminate duplicate requests. The asset module 236 can also pass the request to the asset fetch module 238. The asset fetch module 238 can identify local content versus remote content, and as necessary download, decrypt and re-encrypt content against the downloading account. The asset fetch module 238 can also provide the content to the requesting plugin (e.g., the 3D character SDK 118) and run any cache cleanup routines as necessary.

Figure 3:
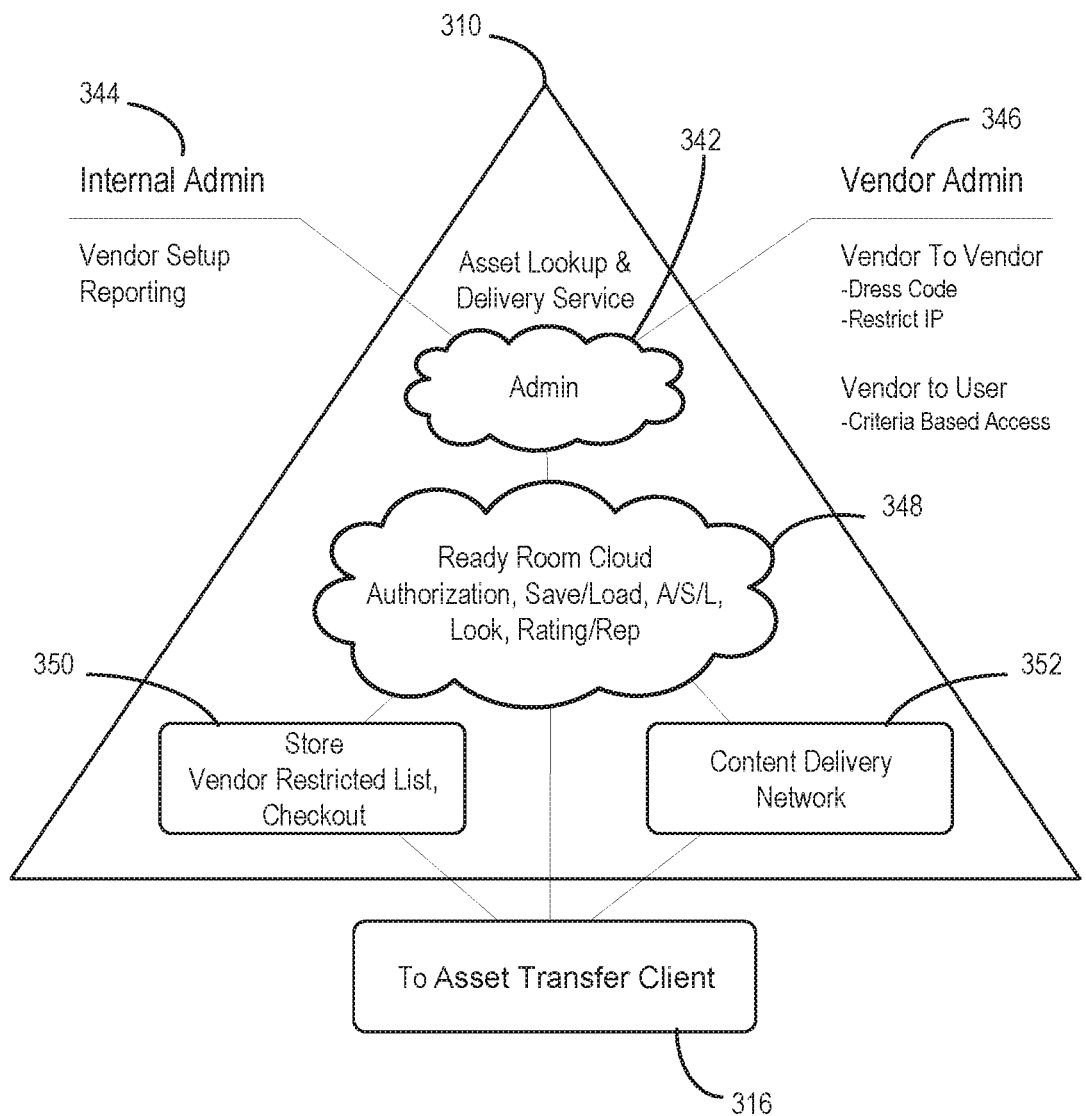
FIG. 3 is a block diagram of an asset lookup and delivery service, according to one embodiment.

FIG. 3 is a block diagram of an asset lookup and delivery service 310 according to one embodiment. The asset lookup and delivery service 310 can include an admin module 342, a ready room cloud module 348, a store module 350, and a content delivery network 352. The asset lookup and delivery service 310 can be in communication with the asset transfer client 316.

The asset lookup and delivery service 310 can be a remote hypertext transfer protocol (HTTP)/2.0 over a secure socket layer (SSL) based application. The asset lookup and delivery service 310 can include needed end points for the asset transfer client 316 to enable communication between the asset lookup and delivery service 310 and the asset transfer client 316. The asset lookup and delivery service 310 can include an admin module 342 comprising administrative graphical user interfaces (GUIs) for managing the identity system 100 and for individual vendors to manage content and stores within or associated with the system 100.

For example, the admin module 342 can include an internal admin module 344 to provide vendor setup capabilities and reporting capabilities. The admin module can also include a vendor admin module 346 to provide vendor-to-vendor capabilities and vendor-to-user capabilities. The vendor-to-vendor capabilities can include dress code enforcement and restricted internet protocol (IP) enforcement. The vendor-to-user capabilities can include criteria based access.

Additionally, the asset lookup and delivery service 310 provides the data collection point for a cross application social and reputation system to additionally add a way to have a level of persistence on the actions associated with a user and/or a persistent virtual identity. The asset lookup and delivery service 310 can also define an access that users and/or vendors have to a data collection point including the reputation data. The asset lookup and delivery service 310 can also include a rating system, for user ratings of vendors, with configurable vendor settings to give input and/or weight to social reputation.

The asset lookup and delivery service 310 can be divided into three subsystems: store module 350 (e.g., store API), content delivery network (CDN) 352, and ready room cloud module 348. The ready room cloud module 348 can comprise an API for the asset lookup and delivery service 310. The ready room cloud module 348 can authorize the manipulation of 3D assets, can save and/or load the state of a 3D asset, can determine a visual description of a 3D asset, and can rate interactions with the user interface 124 and/or applications 122 (see FIG. 1). Each of the subsystems can be accessed independently from each other. The store module 350 provides shopping and purchasing functionality such as a vendor restricted list and a checkout module. The checkout module can provide checkout functionalities associated with a financial transaction. The CDN 352 provides a fast and optimized asset lookup and delivery of assets, along with streaming support. The ready room cloud module 348 provides the functionality to support either the asset transfer client library 316 and/or the admin module 342 (e.g., administrative UI).

In some examples, the asset lookup and delivery service 310 can be a remote service to upload content prepared by the artist tools. The asset lookup and delivery service 310 can be configured to stream the content prepared by the artist tools to the clients (e.g., applications 122). As previously described, the asset lookup and delivery service 310 can provide the internal admin module 344 and the vendor admin module 346 that interact with the admin module 342. Data and assets can be passed from the admin module 342 to the ready room cloud module 348, which marshals the data to be sent either directly down to clients as requested or passed onto the store module 350 and/or the CDN 352 to pass down to end clients including the asset transfer client library/service 316 implemented in associated applications.

The internal admin module 344 initiates and monitors systems and vendors. The internal admin module 344 can provide insight into metrics such as number of users and load across the system, set up and manage vendors, configure global shopping parameters, and/or generate reports across the system.

The vendor admin module 346 uploads and manages 3D assets. The vendor admin module 346 provides a user the ability to upload 3D assets, configure the 3D assets for any additional data needed, allow 3D assets to be set up (for purchase or free) default associations of users that connect to their brand module, and allow users to set up access control lists (ACLs) (e.g., restrict IP) for 3D assets and dress code standards that their brand module enforces. The ACLs allow a vendor to set up what content from other brand modules is allowed in and what content to what brand modules the content for this brand module is allowed to be consumed in. This allows a high degree of control for a vendor to make sure items to be loaded into their application are appropriate, stylistically fitting, and on brand as desired. The dress code standards (e.g., VR passport) additionally allow a vendor to put restrictions on what can be used or worn in their application and if there are required artistic styles.

The admin module 342 is the data store and logical component that handles the processing and prepping of the content (e.g., 3D assets), serving largely as the systemic point of authority. The admin module 342 provides 3D assets and associated data for distribution. For example, the admin module 342 may provide a 3D asset over a network, such as a content delivery network (CDN) for delivery to the ready room VR 120 or an application 122 facilitated by the asset transfer client 116. The admin module 342 takes uploaded 3D assets from the artist tools 108, reprocesses and breaks that 3D asset into a more streaming optimal format, and makes it available to download (e.g., on a public facing URL) that a ready room 120 or an application 122 can authenticate to download.

The ready room cloud module 348 can receive data in a per vendor view from the admin module 342 to allow fast queries for data and asset sets specific to what a vendor allows. The ready room cloud module 348 passes data specific to store functionality (e.g., shopping, previewing, and/or checkout) to the store module 350. The ready room cloud module 348 also provides the data to the CDN 352 to handle asset resolution and streaming of assets. The CDN 352 downloads assets for different LOD levels or different material presets programmatically. Other client API requests can be processed by the ready room cloud module 348 to process data about individual identities, to determine what content is being currently used by at least one of the CDN 352 and the ready room cloud module 348, and to determine an access that the CDN 352 and/or the ready room cloud module 348 have to 3D assets.

Figure 4:
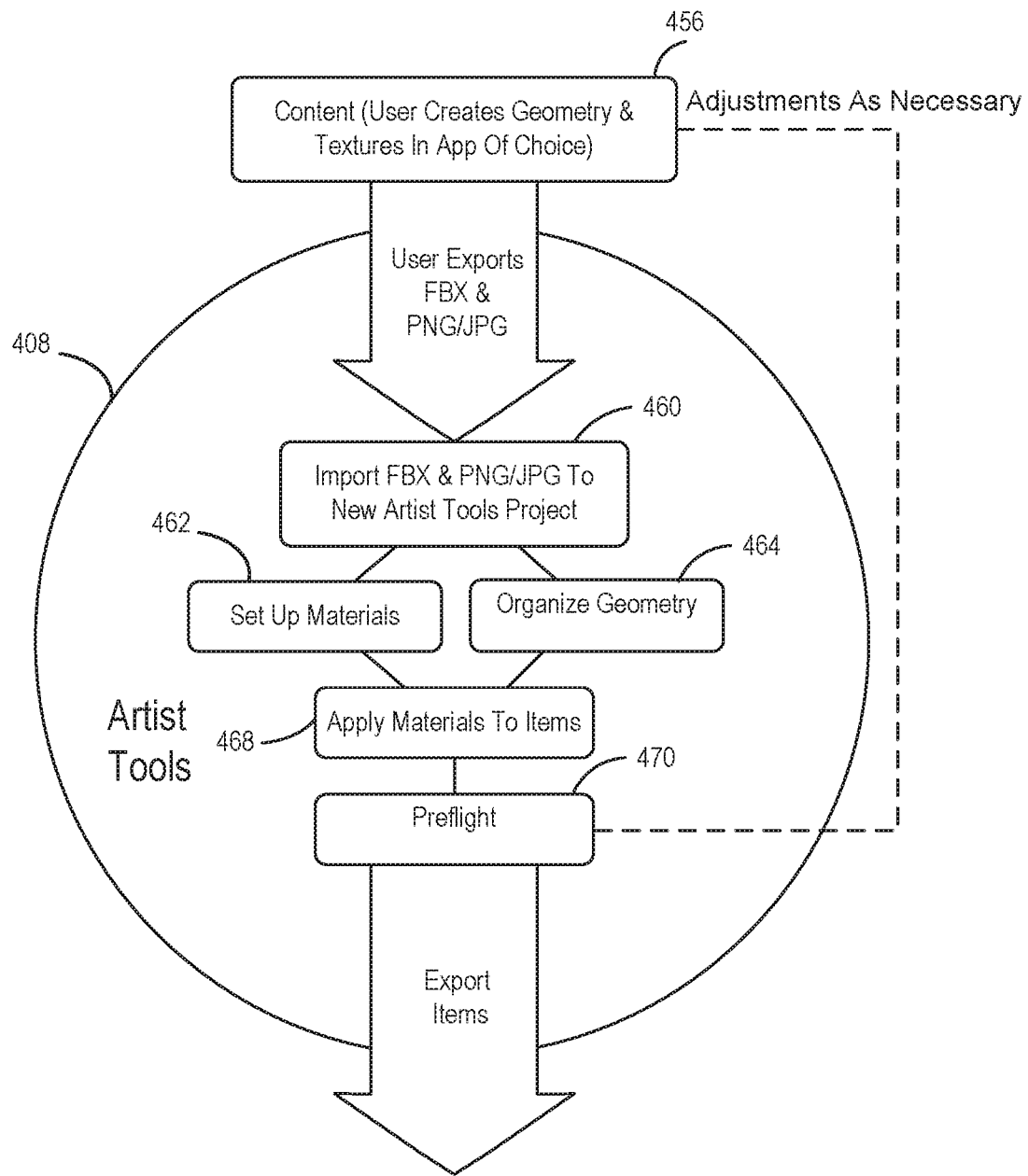
FIG. 4 is a block diagram of artist tools, according to one embodiment.

FIG. 4 is a block diagram of artist tools 408 according to one embodiment. The artist tools 408 includes an import module 460, a materials module 462, a geometry module 464, an application module 468, and a preflight module 470.

A user (e.g., 3D artist) can generate content 456 in an external or third-party 3D content creation application (e.g., Maya, Blender, and/or 3DS Max) and export the content 456 to a filmbox format (e.g., FBX), a portable network graphic (PNG) format, and/or a joint photographic expert group (JPEG) format (e.g., JPG format), among other possible formats. The 3D artist can also export textures and materials, in standard formats, associated with the content created using the 3D content creation application. The content 456 can then be manipulated and/or otherwise configured using the artist tools 408.

The artist tools 408 can be a standalone application that imports content 456 (e.g., in a standard format as exported from a 3D content creation application) and configures the content 456 to be compatible with the 3D character SDK. The content 456 can be imported via the import module 460. The content 456 can include user created geometry and textures.

The user can then create a new project and import the content 456 (e.g., FBX file) into the project. The content 456 can include geometry, materials, rig, and/or textures. The content 456 can be parsed. The organize geometry module 464 enables a user to organize the geometry into items. The user can also create metadata and associate the metadata with the items to allow the items to be identified. The metadata can provide an automatic behavior associated with the items. The metadata can also provide a level of detail groups for the items.

The artist tools 408 can also configure new materials or select existing materials via the materials module 462. As noted previously, a material may be a combination of texture files, shaders, and different maps.

The artist tools 408 can also apply the material to the items via the application module 468 by associating the materials with the corresponding items. Once set up, the items are prepped and tested to ensure that the items function properly. The items can be tested via the preflight module 470. The test can include geomap generation, alpha injection mapping using multilayer depth preservation techniques, auto skinning of the asset if needed, setting up heterogeneous mesh behavior, and/or more.

Once the tests are complete, a user (e.g., 3D artist), via the artist tools 408, can drive the content through a "fitting" operation to fit the content to a base figure, and test out the deformation and animation to ensure that the content functions properly. The user can make adjustments as necessary to ensure that the content functions properly. The artist tools 408 can then export the items in standard formats to other applications. The artist tools 408 can also export the items in formats accepted/recognized by the 3D character SDK.

Figure 5:
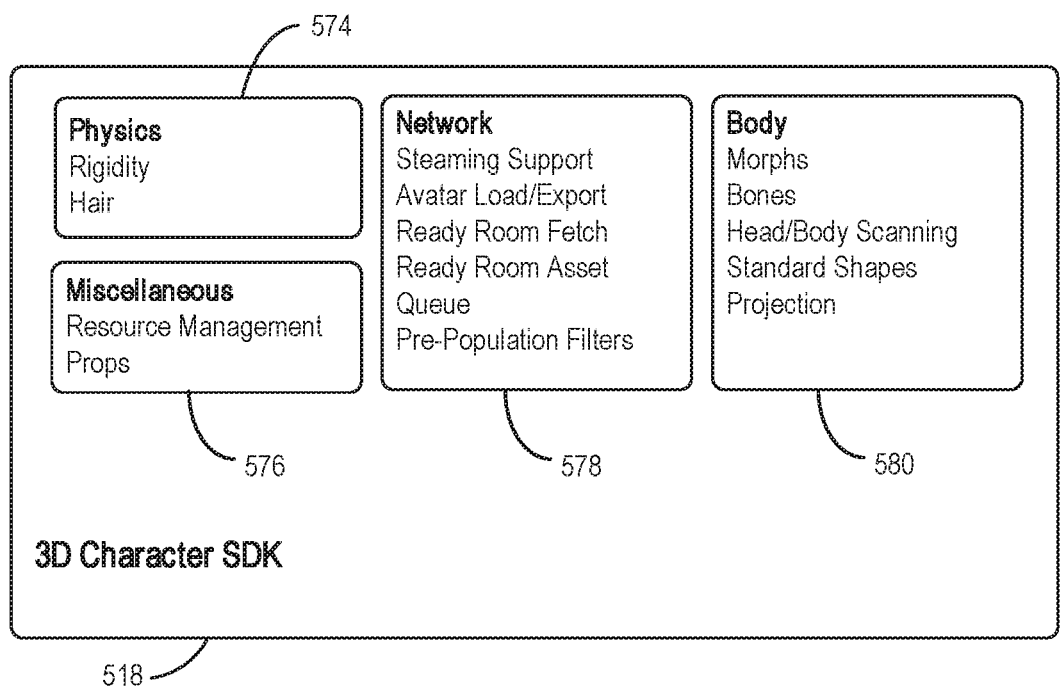
FIG. 5 is a block diagram of a 3D character SDK, according to one embodiment.

FIG. 5 is a block diagram of a 3D character SDK 518 according to one embodiment. The 3D character SDK 518 comprises a physics module 574, a miscellaneous module 576, a network module 578, and a body module 580.

The 3D character SDK 518 provides a list of independent functionalities and calls to drive the content in specific ways. The 3D character SDK 518 can be used to fit clothes on a 3D asset, generate deformations of the 3D asset, transition between art styles, transform bone structures associated with the 3D asset, and/or affect heterogeneous mesh behavior, rigidity, and/or hair.

For example, rigidity and/or hair associated with a 3D asset can be configured via the physics module 574. Resource management and props associated with the 3D asset can be configured via the miscellaneous module 576. The streaming support, the avatar loading/exporting, the ready room fetch, the ready room asset queue, and/or the pre-population filters can be configured via the network module 578. The morphing, the bone structure, the head/body scanning, the standard shapes, and/or the projection associated with a 3D asset can be configured via the body module 580. The 3D character SDK 518 can perform specific tasks without a specific flow or process across the 3D character SDK 518.

The network module 578 includes a subset of network calls to pull down or push up data. Streaming support is a custom 3D file format optimized for streaming data and is platform agnostic. Avatar load/export includes calls for loading in an avatar definition, saving an avatar definition, and exporting an avatar to a different application. RR Fetch and RR asset queue go hand in hand in that RR Fetch fetches assets by putting them into an asynchronous RR asset queue for streaming down, caching, and loading in of assets from the web to a local location, so that, once downloaded, they can be accessed quickly from a hot or warm cache. Pre-population filters may include application filters that different queries are automatically filtered by so that only content that an application allows to come in will get sent from the network SDK.

The body module 580 includes operations to modify an appearance of a 3D asset. Morphs are the delta change of the vertices, also known as blend shapes, that shapes the geometry to different orientations, so going skinny to fat is through these. Bones are bits of 3D data that may be analogous to a skeleton that vert influence levels are associated with and that allow the movement and animation of a 3D asset (e.g., a figure or avatar). Head/body scanning is an example of new technology of taking scan data and generating morphs and materials to match it so it fits within the system and rig instead of generating all new 3D data. Standard shapes may enable theme swapping of a standard set of shaping. Projection relates to runtime projection and mapping.

Figure 6:
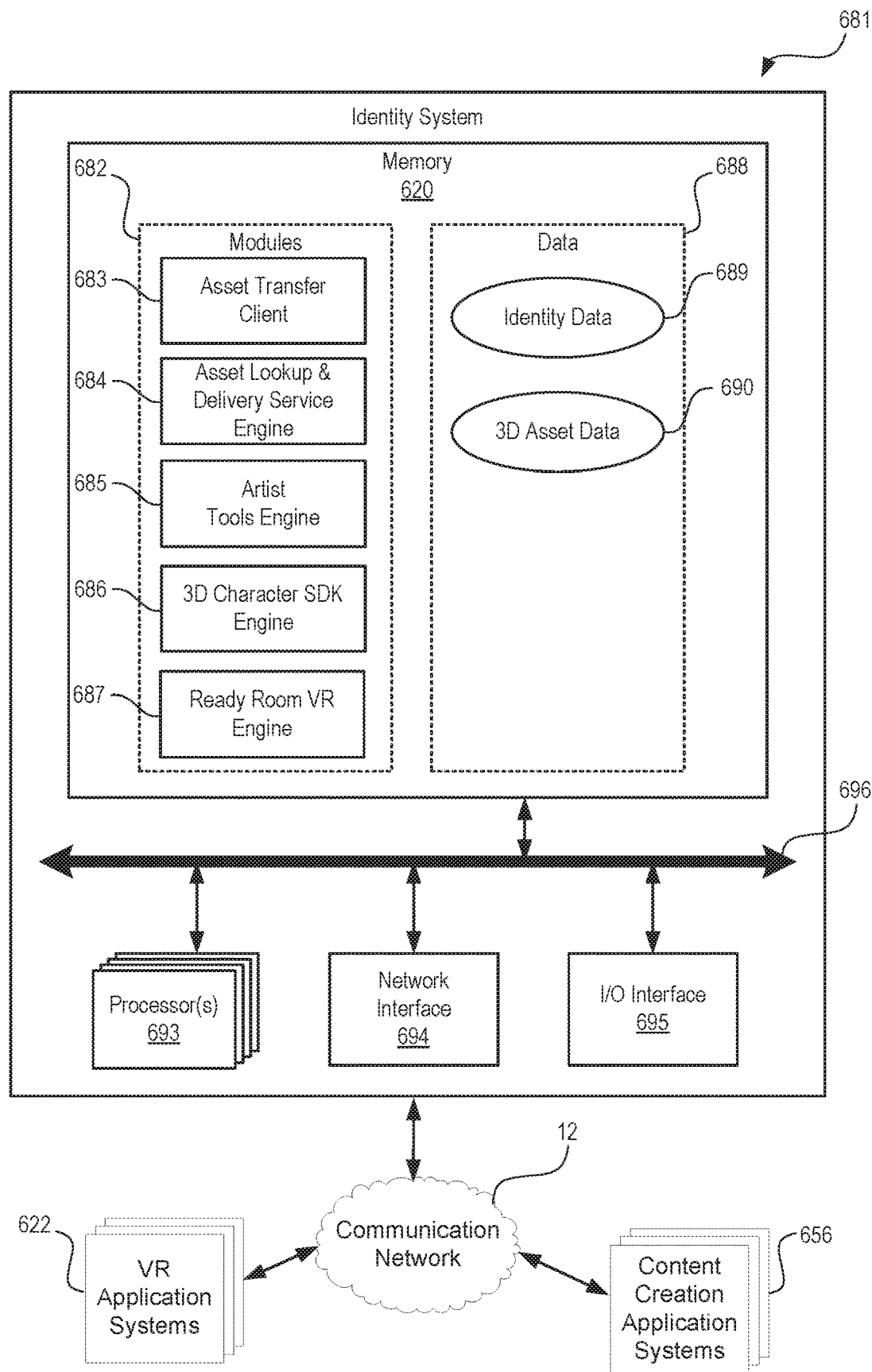
FIG. 6 is a block diagram of a persistent virtual identity system, according to one embodiment.

FIG. 6 is a block diagram of an identity system according to one embodiment The mobile device identity system 681 can generate a persistent virtual identity that can be transferred between applications, potentially on different application systems 622. The identity system 681 can include a memory 620, one or more processors 693, a network interface 694, an input/output interface 695, and a system bus 696. The identity system 681 may be the similar to or analogous to the interface system 100 in FIG. 1. The identity system 681 may interface with one or more VR application systems 622 via a communication network 12. The identity system 681 may provide persistent virtual identity for the VR application systems 622. The identity system 681 may also interface with one or more content creation application system 656 to obtain 3D assets.

The one or more processors 693 may include one or more general purpose devices, such as an Intel®, AMD®, or other standard microprocessor. The one or more processors 693 may include a special purpose processing device, such as ASIC, SoC, SiP, FPGA, PAL, PLA, FPLA, PLD, or other customized or programmable device. The one or more processors 693 can perform distributed (e.g., parallel) processing to execute or otherwise implement functionalities of the presently disclosed embodiments. The one or more processors 693 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 620 may include static RAM, dynamic RAM, flash memory, one or more flip-flops, ROM, CD-ROM, DVD, disk, tape, or magnetic, optical, or other computer storage medium. The memory 620 may include a plurality of program engines 682 (and/or modules) and program data 688. The memory 620 may be local to the identity system 681, as shown, or may be distributed and/or remote relative to the identity system 681.

The program engines 682 may include all or portions of other elements of the system 681. The program engines 682 may run multiple operations concurrently or in parallel with/on the one or more processors 693. In some embodiments, portions of the disclosed modules, components, and/or facilities are embodied as executable instructions embodied in hardware or in firmware, or stored on a non-transitory, machine-readable storage medium, such as the memory 620. The instructions may comprise computer program code that, when executed by a processor and/or computing device, cause a computing system (such as the processors 693 and/or the identity system 681) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 620 may also include program data 688. Data generated by the system 681, such as by the program engines 682 or other modules, may be stored on the memory 620, for example, as stored program data 688. The stored program data 688 may be organized as one or more databases. In certain embodiments, the program data 688 may be stored in a database system. The database system may reside within the memory 620. In other embodiments, the program data 688 may be remote, such as in a distributed computing and/or storage environment. For example, the program data 688 may be stored in a database system on a remote computing device.

The input/output interface 695 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 694 may facilitate communication with other computing devices and/or networks and/or other computing and/or communications networks. The network interface 694 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 694 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 696 may facilitate communication and/or interaction between the other components of the system, including the one or more processors 693, the memory 620, the input/output interface 695, and the network interface 694.

As noted, the interface system 681 also includes various program engines 682 (or modules, elements, or components) to implement functionalities of the system 681, including an asset transfer client engine 683, an asset lookup and delivery service engine 684, an artist tools engine 685, a 3D character SDK engine 686, and/or a ready room VR engine 687. These elements may be embodied, for example, at least partially in the program engines 682. In other embodiments, these elements may be embodied or otherwise implemented in hardware of the system 681. The system 681 also includes identity data 689 and 3D asset data 690 that may be stored in the program data 688 which may be generated, accessed, and/or manipulated by the program engines 682.

Figure 7:
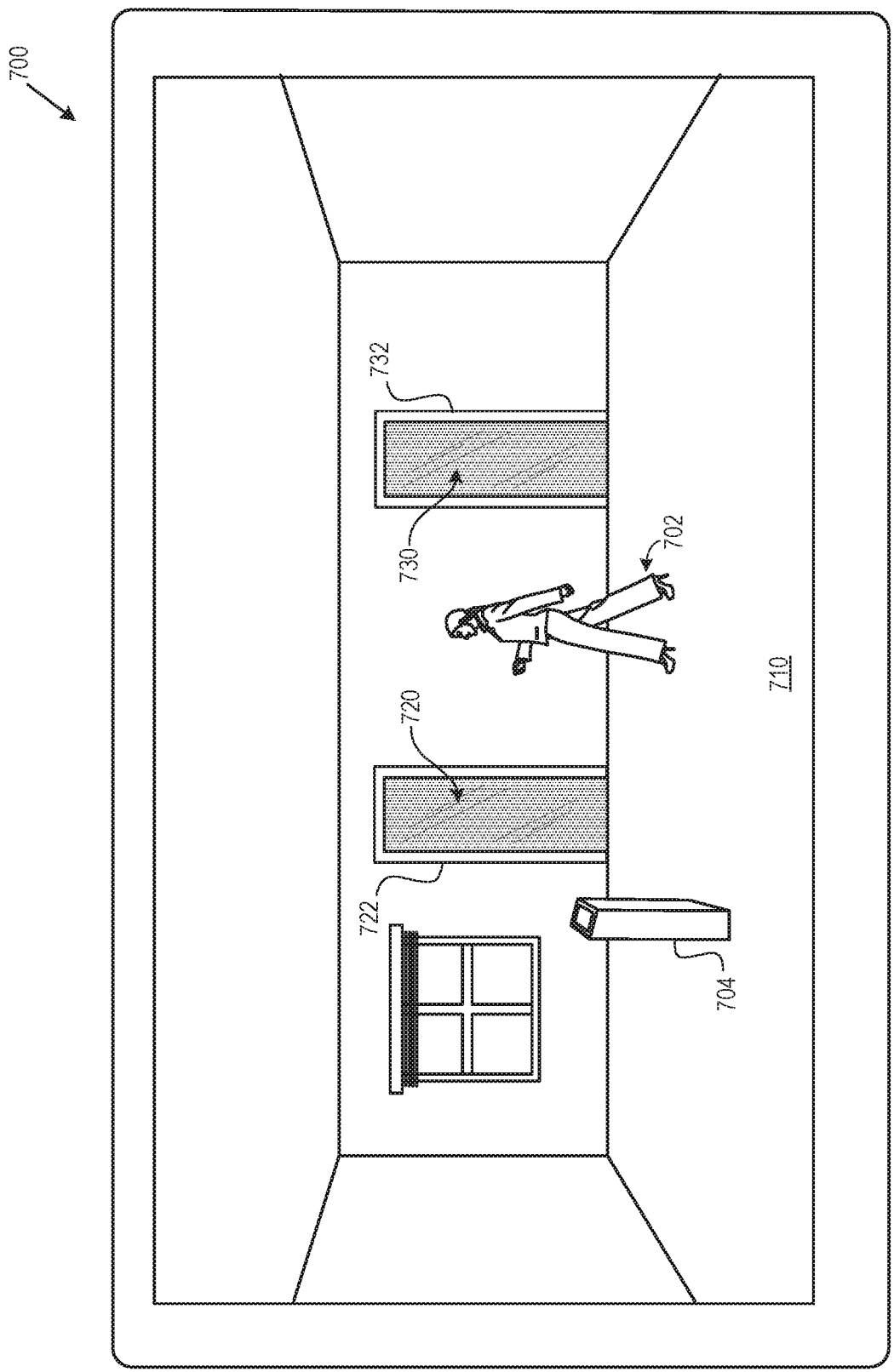
FIG. 7 is a graphical user interface of persistent virtual identity system, according to one embodiment, showing a ready room in virtual reality and portals to source application and a destination application.

FIG. 7 is a graphical user interface 700 of persistent virtual identity system, according to one embodiment. The graphical user interface 700 is presented in a display, such as a desktop computer monitor or a viewer (e.g., headset) for a virtual reality system or augmented reality system. The graphical user interface 700 shows a ready room 710 in virtual reality and portals 722, 732 to a source application 720 and a destination application 730. A 3D asset 702 is shown in the ready room 710. The 3D asset 702 is an avatar in the form of a bipedal humanoid character that has been customized according to user preferences. The avatar 702 comprises a base 3D asset and following 3D assets in the form of clothing. The avatar 702 could proceed to the console 704 to initiate a deformation to any of the base 3D asset and/or the following 3D assets to further customize the avatar 702. Stated otherwise, a user could direct movement of the avatar 702 to the console 704 in VR and further customize characteristics of the avatar 702. The avatar 702 may have moved from the source application 720 (and/or platform) through the source portal 722 and into the ready room 710. The ready room 710 facilitates transport of the avatar 702 from the source application 720 to the destination application 730. The avatar 702 may move into the destination application 730 (and/or platform) my movement through the destination portal 732. As described above, the systems and methods disclosed herein may enable persistent virtual identity, including transport of the avatar between applications by removing the avatar 702 and/or persistent virtual identity from the source application 720 and injecting the avatar 702 and/or persistent virtual identity to the destination application 720.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A persistent virtual identity system for transporting a virtual identity between a plurality of applications, the system comprising: an artist tools engine to receive a three dimensional (3D) asset in an electronic format from a 3D content creation application; an asset lookup and delivery service engine to enforce one or more standards on the 3D asset, the one or more standards corresponding to an application of the plurality of applications; an asset transfer client engine to receive the 3D asset from the asset lookup and delivery service engine and associate a persistent virtual identity with the 3D asset; a 3D character software development kit (SDK) engine to facilitate configuring at least a characteristic of the 3D asset according to an input of a user of the persistent virtual identity system; and a ready room engine to transition the 3D asset from a first application of the plurality of applications to a second application of the plurality of applications. The ready room engine can transition the 3D asset by removing the 3D asset from the first application and instantiating the 3D asset in the second application.

Example 2

The persistent virtual identity system of Example 1, wherein the artist tools engine is further to configure the 3D asset to be compatible with the persistent virtual identity system.

Example 3

The persistent virtual identity system of Example 1, wherein the artist tools engine is further to configure the 3D asset to be compatible with the 3D character SDK engine.

Example 4

The persistent virtual identity system of Example 2, wherein the artist tools engine configures the 3D asset to be compatible by one or more of: grouping the geometry into one or more items; defining the levels of details for each of the one or more items; generating geographical maps (geo-maps); adding self-defining behavioral information to objects for runtime simulation; configuring materials of the 3D asset; configuring multilayered characteristics of the geometry for runtime-optimized multilayer depth and volumetric preservation between meshes; and setting up zones on items for heterogeneous mesh deformation.

Example 5

The persistent virtual identity system of Example 1, wherein the artist tools engine is further to upload 3D asset to the asset lookup and delivery service to be stored for future access by the 3D character SDK engine.

Example 6

The persistent virtual identity system of Example 1, wherein persistent virtual identity comprises one or more of: a set of one or more following 3D assets, history associated with a user of the system, social reputation, social standing, inventory, wardrobe, and trophies.

Example 7

The persistent virtual identity system of Example 1, further comprising: one or more brand modules each corresponding to an application of the plurality of applications and providing one or more of standards, rules, and protocols for the corresponding application, wherein the asset lookup and delivery service is further to configure the 3D asset according to user specified distribution based upon rules and conditions associated with the 3D asset and as provided by the one or more brand modules.

Example 8

The persistent virtual identity system of Example 1, wherein the 3D character SDK engine includes one or more of: a morphing module, a joint center transform (JCT) bone module, a standard shape module, a projection module, a head scanning to a dynamic mesh fitting module, a heterogeneous mesh behavior module, a hair module, and a smart props module.

Example 9

The persistent virtual identity system of Example 1, wherein the first application is configured for a first computing platform and the second application is configured for a second computing platform.

Example 10

The persistent virtual identity system of Example 9, wherein the first computing platform is a virtual reality (VR) platform and the second computing platform is a VR platform.

Example 11

The persistent virtual identity system of Example 1, wherein, as part of the ready room engine transitioning the 3D asset into the second application: the asset lookup and delivery service engine transitions from enforcing the one or more standards corresponding to the first application to enforcing one or more standards corresponding to the second application; and the 3D character SDK conforms the 3D asset to the one or more standards corresponding to the second application.

Example 12

The persistent virtual identity system of Example 11, wherein the ready room engine transitions the 3D asset into the second application in a manner such that settings and status of the 3D asset remain the same through the transition to begin in the second application as they were in the first application. Stated otherwise, the ready room engine can transition the 3D asset such that the settings and status of the 3D asset are the same in the second application as they were in the first application, following the transition.

Example 13

The persistent virtual identity system of Example 11, wherein the one or more standards the 3D character SDK conforms the 3D asset to include one of: an art style of the second application; a theme of the second application.

Example 14

The persistent virtual identity system of Example 1, further comprising an application interface to enable electronic communications with the plurality of applications.

Example 15

An apparatus for providing a ready room in virtual reality (VR) to transition an avatar representing a persistent virtual identity between a plurality of applications, comprising: memory to store 3D assets; and one or more processing units configured to: process a 3D asset received from a source application and stored in the memory; determine a plurality of standards associated with the 3D asset; compare the plurality of standards associated with the 3D asset with a plurality of standards enforced by a destination application; configure the plurality of standards associated with the 3D asset to conform with the plurality of standards enforced by the destination application based on a determination that the plurality of standards associated with the 3D asset do not conform to the plurality of standards enforced by the destination application; and transfer the 3D asset to the destination application based on a determination that the plurality of standards associated with the 3D asset conform to the plurality of standards enforced by the destination application.

Example 16

The apparatus of Example 15, wherein the plurality of standards include a standard associated with an artistic style of the 3D asset.

Example 17

The apparatus of Example 15, wherein the plurality of standards include a standard associated with a following 3D asset of the 3D asset.

Example 18

The apparatus of Example 17, wherein the following 3D asset is a clothing 3D asset associated with the 3D asset.

Example 19

The apparatus of Example 15, wherein the plurality of standards include a standard associated with a theme of the 3D asset.

Example 20

The apparatus of Example 15, wherein the memory is further configured to store one or more persistent virtual identities, and wherein the one or more processing units is further configured to associate a persistent virtual identity stored in memory with the 3D asset.

Example 21

The apparatus of Example 15, wherein the 3D asset is received via a network message.

Example 22

A computer-implemented method for maintaining a persistent 3D asset between a plurality of applications, comprising: receiving at a computing device a 3D asset in an electronic format from a source application of the plurality of applications; determining, by one or more processors of the computing device, one or more features of the 3D asset corresponding to standards associated with the 3D asset; comparing, by the one or more processors, the one or more features of the 3D asset that correspond to the plurality of standards associated with the 3D asset to a plurality of standards enforced by a destination application of the plurality of applications; configuring, by the one or more processors, the one or more features of the 3D asset to conform with the plurality of standards enforced by the destination application based on a determination that the one or more features of the 3D asset do not conform to the plurality of standards enforced by the destination application; and transferring the 3D asset to the destination application based on a determination that the plurality of standards associated with the 3D asset conform to the plurality of standards enforced by the destination application.

Example 23

The computer-implemented method of Example 22, wherein the plurality of standards include a standard associated with an artistic style of the 3D asset.

Example 24

The computer-implemented method of Example 22, further comprising associating a persistent virtual identity with the 3D asset.

Example 25

A persistent virtual identity system to transport a persistent virtual identity between a plurality of applications, comprising: an artist tools engine to configure a 3D asset to be compatible with the persistent virtual identity system by one or more of, grouping the geometry into one or more items, defining the levels of details for each of the one or more items, and generating geographical maps (geomaps); an asset lookup and delivery service engine to enforce one or more standards on the 3D asset, the one or more standards corresponding to an application of the plurality of applications; an asset transfer client engine to associate a persistent virtual identity with the 3D asset; a 3D character software development kit (SDK) engine to modify one or more features of the 3D asset; and a ready room engine to: receive a 3D asset in an electronic format from a source application of the plurality of applications, the 3D asset including a base 3D model and one or more modifications thereto to define a unique figure for presentation in the source application; configure, by the artist tools engine, the 3D asset to be compatible with the persistent virtual identity system; update the one or more standards from corresponding to the source application to corresponding to a destination application of the plurality of applications; enforce, by the asset lookup and delivery service engine, one or more standards on the 3D asset; modify, by the 3D character SDK engine, on or more features of the 3D asset to conform to the one or more standards; transition the 3D asset from the source application to the destination application, including removing the 3D asset from the source application, wherein the ready room engine transitions the 3D asset into the destination application in a manner such that settings and status of the 3D asset remain the same through the transition to begin in the destination application as they were in the source application.

Example 26

The persistent virtual identity system of Example 25, wherein the artist tools are further configured to receive a following 3D asset and configure the following 3D asset to be compatible with the 3D character SDK engine; the asset lookup and delivery service engine to enforce one or more standards on the following 3D asset and store the following 3D asset for access by the 3D character SDK; the 3D character SDK to receive input from a user to add the following 3D asset to the unique figure; the asset transfer client engine to receive the 3D asset from the asset lookup and delivery service engine and associate the following 3D asset with the persistent virtual identity of the 3D asset of the unique figure.

Example 27

An apparatus for processing face scan data, comprising: memory to store face scan data; and one or more processing units configured to: identify facial and head landmarks on the face scan data and the base figure; generate a blend shape for the base figure to match the face scan data by reshaping a base mesh associated with the base figure, to conform to a shape of the face scan data, based on the facial and head landmarks; and rebuild a texture associated with the face scan data to fit the base figure UV map.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus for providing a ready room in virtual reality (VR) to transition an avatar representing a persistent virtual identity between a plurality of applications, comprising:
   memory to store 3D assets; and
   one or more processing units configured to:
      process a 3D asset received from a first source application and stored in the memory, wherein the 3D asset includes a base 3D model and one or more modifications;
      convert the 3D asset to be compatible with a 3D character software development kit (SDK) engine by grouping geometries of the 3D asset into one or more items;
      identify a first vendor of the source application from which the 3D asset originated;
      determine a plurality of standards from the first vendor associated with the 3D asset;
      compare the plurality of standards from the first vendor associated with the 3D asset with a plurality of standards from a second vendor enforced by a destination application, wherein the source application and the destination application are configured for a first computing platform and a second computing platform respectively, wherein the first computing platform provides a first computing environment compatible to execute the first source application and the second computing platform provides a second computing environment compatible to execute the second source application, and wherein the first computing platform and the first computing environment are incompatible with the second source application and the second computing platform and the second computing environment are incompatible with the first source application, wherein the first computing platform and the second computing platform comprise at least one of hardware and an operating system;
      determine content restrictions defined between the first vendor of the source application and the second vendor of the destination application based on vendor-to-vendor content standards;
      configure, via the 3D character SDK engine, the 3D asset, including the one or more items of the 3D asset, to transform from the plurality of standards from the first vendor associated with the 3D asset to conform with the plurality of standards from the second vendor enforced by the destination application based on a comparison of and a determination that the plurality of standards associated with the 3D asset do not conform to the plurality of standards enforced by the destination application according to the vendor-to-vendor content standards;
      transfer the 3D asset to the destination application based on a determination that the plurality of standards associated with the 3D asset conform to the plurality of standards enforced by the destination application; and
      maintain, via the 3D character SDK engine, the one or more modifications of the 3D asset consistently across the first source application and the second source application.

2. The apparatus of claim 1, wherein the plurality of standards include a standard associated with an artistic style of the 3D asset.

3. The apparatus of claim 1, wherein the plurality of standards include a standard associated with a following 3D asset of the 3D asset.

4. The apparatus of claim 1, wherein the plurality of standards include a standard associated with a theme of the 3D asset.

5. The apparatus of claim 1, wherein the memory is further configured to store one or more persistent virtual identities, and
   wherein the one or more processing units is further configured to associate a persistent virtual identity stored in memory with the 3D asset.

6. A computer-implemented method for maintaining a persistent 3D asset between a plurality of applications, comprising:
   receiving at a computing device a 3D asset in an electronic format from a source application of the plurality of applications wherein the 3D asset includes a base 3D model and one or more modifications;
   converting the 3D asset to be compatible with a 3D character software development kit (SDK) engine;
   identifying a first vendor associated with the source application from which the 3D asset originated;
   determining, by one or more processors of the computing device, one or more features of the 3D asset corresponding to standards from the first vendor associated with the 3D asset;
   comparing, by the one or more processors, the one or more features of the 3D asset that correspond to the plurality of standards from the first vendor associated with the 3D asset to a plurality of standards from a second vendor enforced by a destination application of the plurality of applications, wherein the source application and the destination application are configured for a first computing platform and a second computing platform respectively, wherein the first computing platform provides a first computing environment compatible to execute the first source application and the second computing platform provides a second computing environment compatible to execute the second source application, and wherein the first computing platform and the first computing environment are incompatible with the second source application and the second computing platform and the second computing environment are incompatible with the first source application, wherein the first computing platform and the second computing platform comprise at least one of hardware and an operating system;
   determining content restrictions defined between the first vendor of the source application and the second vendor of the destination application based on vendor-to-vendor content standards;
   configuring, by the one or more processors via the 3D character SDK engine, the one or more features from the first vendor of the 3D asset to conform with the plurality of standards from the second vendor enforced by the destination application based on a comparison of and a determination that the one or more features of the 3D asset do not conform to the plurality of standards enforced by the destination application according to the vendor-to-vendor content standards;

transferring the 3D asset to the destination application based on a determination that the plurality of standards associated with the 3D asset conform to the plurality of standards enforced by the destination application; and maintaining the one or more modifications of the 3D asset consistently across the first source application and the second source application.

7. The computer-implemented method of claim 6, wherein the plurality of standards include a standard associated with an artistic style of the 3D asset.

8. The computer-implemented method of claim 6, further comprising associating a persistent virtual identity with the 3D asset.

* * * * *